(No Model.)
J. H. SMITH, A. GODDARD, L. HIGGINBOTTOM & T. MANNOCK.
APPARATUS FOR CUTTING PILE FABRICS.
No. 475,620. Patented May 24, 1892.
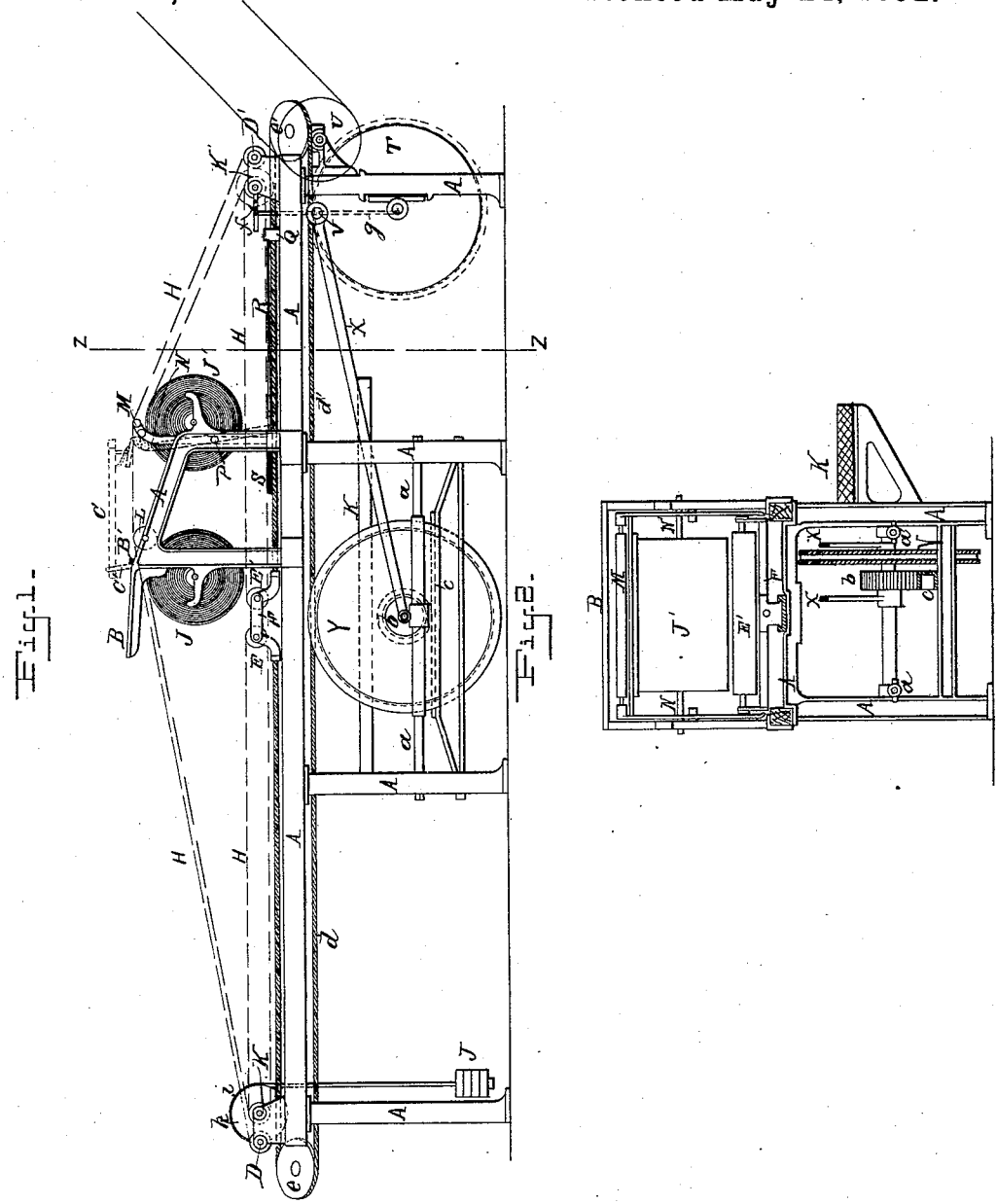
WITNESSES:
James Gracie
S. C. Connor
INVENTORS
James H. Smith
Andrew Goddard
Lloyd Higginbottom
and Thomas Mannock
by Howson and Howson
their ATTORNEYS

United States Patent Office.

JAMES HOYLE SMITH, OF LONGSIGHT, ANDREW GODDARD, OF STOCKPORT, AND LLOYD HIGGINBOTTOM AND THOMAS MANNOCK, OF LONGSIGHT, ASSIGNORS TO THE FUSTIAN CUTTING MACHINE COMPANY, LIMITED, OF SALFORD, ENGLAND.

APPARATUS FOR CUTTING PILE FABRICS.

SPECIFICATION forming part of Letters Patent No. 475,620, dated May 24, 1892.

Application filed May 29, 1891. Serial No. 394,618. (No model.) Patented in Germany September 21, 1887, No. 46,156; in France September 22, 1887, No. 186,020; in England December 10, 1887, No. 16,996; in Belgium November 13, 1888, No. 83,926; in Italy September 29, 1890, No. 28,397, and in Austria-Hungary January 11, 1891, No. 38,959.

*To all whom it may concern:*

Be it known that we, JAMES HOYLE SMITH, of Longsight, Manchester, ANDREW GODDARD, of Stockport, county of Chester, and LLOYD HIGGINBOTTOM and THOMAS MANNOCK, both of Longsight, Manchester, England, all subjects of the Queen of Great Britain and Ireland, have invented certain Improvements in Apparatus for Cutting Pile Fabrics, (for which Letters Patent have been obtained in Great Britain, No. 16,996, dated December 10, 1887; in Austria-Hungary, No. 38,959, dated January 11, 1891; in Belgium, No. 83,926, dated November 13, 1888; in Italy, No. 28,397, dated September 29, 1890, issue date October 30, 1890; in France, patent of addition, November 12, 1888, on No. 186,020, dated September 22, 1887, and in Germany, patent of addition, October 27, 1888, No. 50,716, on No. 46,156, dated September 21, 1887,) of which the following is a specification.

The object of our invention is to effect further improvements in the machine for cutting the pile of velvets, fustians, plushes, and other pile fabrics, for which we have obtained Letters Patent of the United States of America, dated April 22, 1890, No. 426,076. In such machine the fabric was stretched upon a frame to which a reciprocating motion was imparted by power or by a foot-treadle, the cutting-knife being held by hand on a table under which the said frame, with the fabric, moved. According to our present invention we dispense with this moving frame; and the essential features of our new arrangement consist in this, that the fabric is caused to move to and fro over fixed rollers and under a table upon which the knife is held by hand.

We do not limit ourselves to the employment of any particular mechanical means for giving the required reciprocating movement to the fabric; but in the accompanying sheet of drawings Figure 1 is a side elevation, and Fig. 2 a transverse vertical elevation through the line 2 2 in Fig. 1, of an arrangement of the machine which we prefer to employ in practice.

A A is the frame of the machine, B the fixed table, on which the handle of the knife (shown by the dotted lines C) rests. A projection C' on the knife-handle rests against a ledge B' on the table, so that the knife-point is always at the same distance from the table-edge. Pulley-rollers D D' are mounted on each end of the frame, and rollers E E' are mounted on a small carriage F, which is capable of sliding from one end of the frame to the other, as will be presently described. That part of the fabric which is being operated upon for the time being is indicated by the dotted lines H, and the surplus fabric is wound upon the drums J J'. The fabric passes from the drum J to the split roller K, (such as shown in our patent, No. 426,076,) by which it is tightly held. From thence it passes around the rollers E and D, and then over a roller L, just in front of the table. The fabric then goes around the rollers D' and E' to the split roller K', where it is again fastened, and from thence to the drum J'. When the carriage F is moved to and fro, the fabric is also traversed to and fro under the table B; but as it passes around the rollers E E' the length of the fabric which goes past the knife is double the amount of the motion of the carriage F. The small roller M is mounted on the ends of a pair of levers N N', fulcrumed at P, and about three inches before the carriage F reaches the end of its travel it strikes a cross-bar Q, connected by straps R to the lower ends of the levers N N'. This moves the said levers into the position shown by the dotted lines, so that the roller M passes back under the point of the knife sufficiently far to cause the said point to come clear out of the fabric at the end of each cut. The levers N N', except at the moment of being thus forced back, are held in the vertical position against stops by springs S.

The means shown in the drawings for operating the carriage F, though we do not necessarily confine ourselves thereto, consist of a spur-wheel T, driven by a pinion on the shaft of the belt-pulley U. A crank-pin V on the wheel T, by means of the forked connecting-rod X, gives reciprocating motion to the axle and bearings of the grooved wheel Y on the guide-rods A A'. A pinion b, keyed on the axis of the wheel Y, gears with a fixed rack c, so that the said wheel is caused to rotate at the same time that it is moved to and fro by the crank V. Ropes d d' are fixed to and passed around the wheel Y in contrary directions and are led around guide-pulleys e e' to the carriage F, thus converting the rotary motion of the wheel Y into the reciprocating motion of the said carriage.

In cutting pile fabrics, if the "going-out line" be made diagonal instead of straight across the precise place where one cut ends and the next begins is practically invisible, and when we desire to attain this result in our machine we do not rigidly fix the split rollers K K', but we cause the roller K' to be rotated slightly at each cut by a pawl f, operating a ratchet-wheel on the axle of the roller. This pawl is worked by a connecting-rod g from a crank-pin fixed a little out of center in the end of the shaft of the wheel T. The roller K pays out the cloth as the roller K' takes it up, and the necessary tension is put upon the cloth by a drag-brake, consisting of the drum h, brake-band i, and weight j.

K is the platform on which the operator stands. We may, if desired, substitute smooth metal bars for the rollers L and M, though in practice we prefer the rollers, as they reduce the friction of moving the cloth.

In place of the arrangement described for operating the carriage F it may be driven by other suitable means.

The main advantages of machines constructed according to our present invention over those described in our aforesaid prior patent are that we enormously reduce the weight of the moving parts, thus enabling the machine to be run at higher speed with less wear and tear, and we also reduce the space occupied by the machine.

We claim as our invention—

1. The combination, with a reciprocating carriage provided with two rollers, of a pair of tightening-rollers mounted one at each end of the frame and a pair of pulley-rollers, also mounted one at each end of the frame, the cloth passing from the tightening-rollers around the rollers upon the reciprocating carriage, and then around the pulley-rollers, between and above which is arranged a suitable cutting-table, substantially as and for the purposes hereinbefore described.

2. In a machine for cutting pile fabrics, the combination of a knife-supporting table and mechanism for traversing the fabric, with a movable guide-roller, and means, substantially as described, for moving the said guide-roller to bring the knife out of the fabric at the end of the cut, substantially as described.

3. In a machine for cutting pile fabrics, the combination of a knife-supporting table and a traveling carriage to traverse the fabric, with levers carrying a guide-roller to support the fabric at the table, the said levers being adapted to be operated by the carriage as it reaches the end of its traverse to bring the knife out of the fabric at the end of the cut, substantially as described.

4. In a machine for cutting pile fabrics, the combination of a knife-supporting table with mechanism for traversing the fabric backward and forward, and devices, substantially as described, for moving the material slightly as the cutting progresses to give a diagonal going-out line.

5. In a machine for cutting pile fabrics, the combination of a knife-supporting table, mechanism for traversing the fabric backward and forward and split rollers to hold the fabric, with a brake for the split roller on the delivery side of the fabric, and means, substantially as described, for automatically turning the other split roller slightly as the cutting progresses, as and for the purpose set forth.

In testimony that we claim the foregoing we have hereunto set our hands this 6th day of March, 1888.

JAMES HOYLE SMITH.
ANDREW GODDARD.
LLOYD HIGGINBOTTOM.
THOMAS MANNOCK.

Witnesses:
    W. H. RICHARDSON,
    SYDNEY SMITH,
*Clerks with T. Ford Tucker, Solicitor, Manchester.*